UNITED STATES PATENT OFFICE.

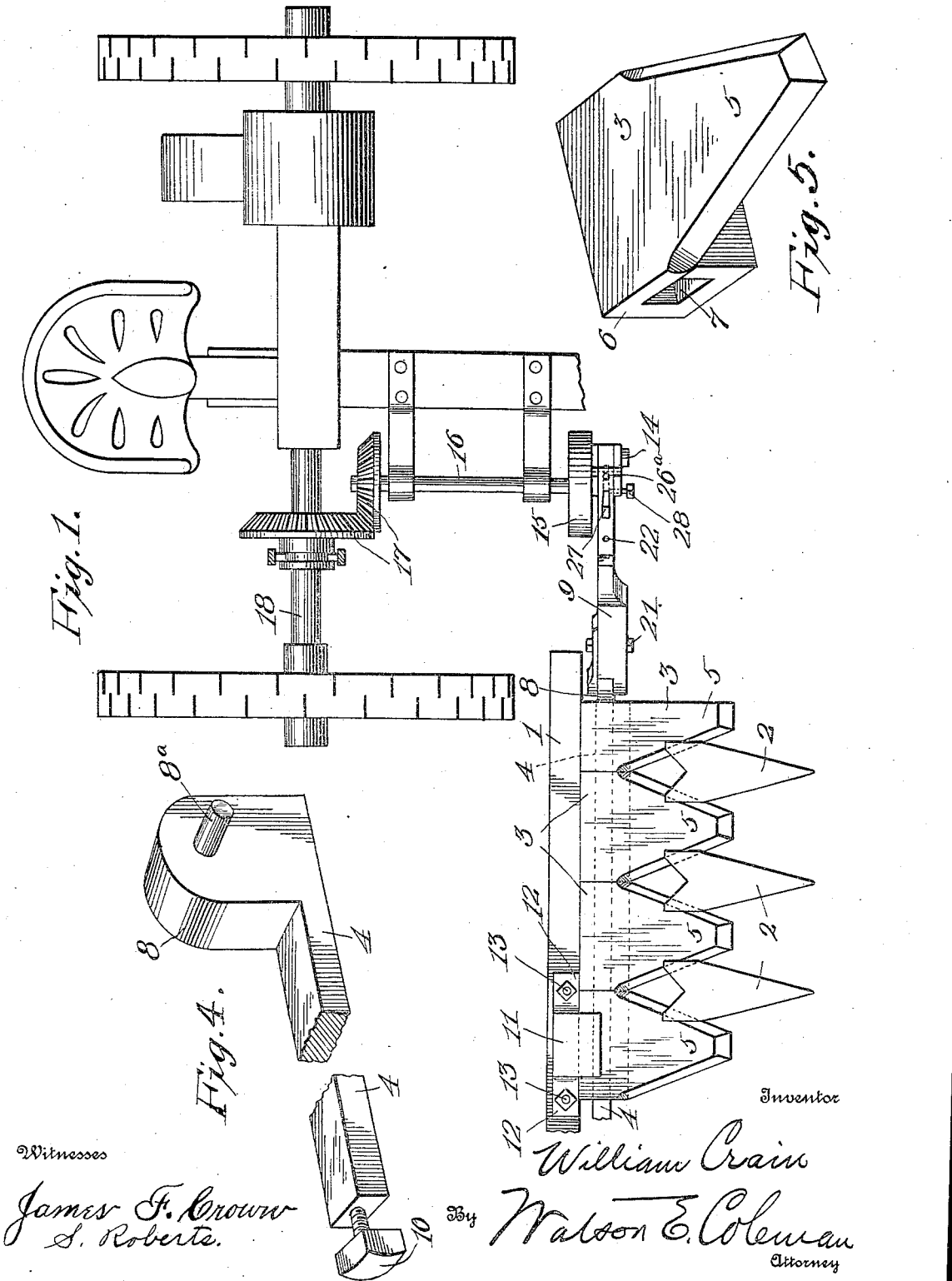

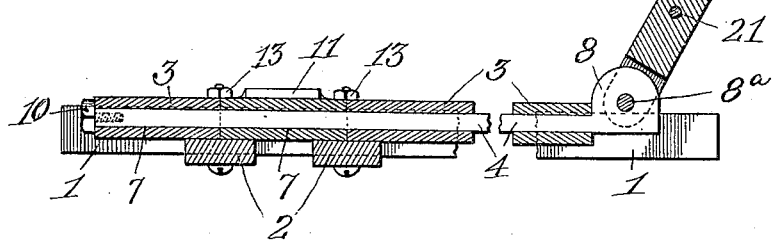
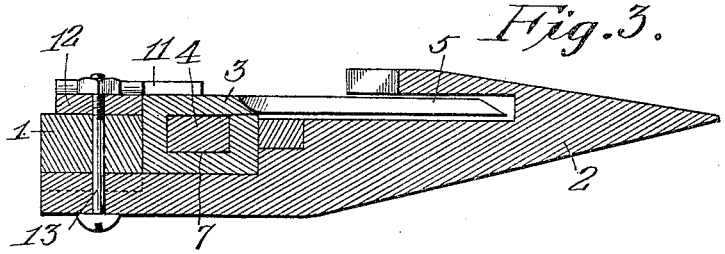
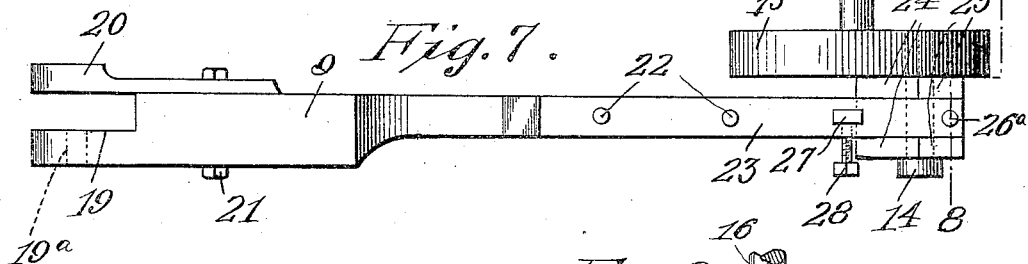
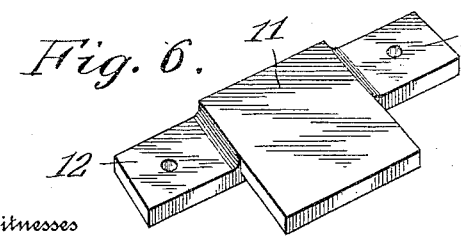
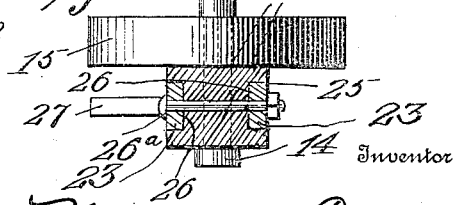

WILLIAM CRAIN, OF PERCY, ILLINOIS, ASSIGNOR OF ONE-HALF TO WILLIAM MOULIC, OF PERCY, ILLINOIS.

MOWING-MACHINE.

943,181.  Specification of Letters Patent. Patented Dec. 14, 1909.

Application filed September 14, 1908. Serial No. 453,005.

*To all whom it may concern:*

Be it known that I, WILLIAM CRAIN, a citizen of the United States, residing at Percy, in the county of Randolph and State of Illinois, have invented certain new and useful Improvements in Mowing-Machines, of which the following is a specification, reference being had to the accompanying drawings.

This invention relates to improvements in mowing machines and more particularly to the sickle or cutter bar and the driving connections therefor.

One object of the invention is to provide a simple and practical cutting apparatus of this character in which the teeth may be readily removed when broken or injured and replaced by new ones, and the teeth can be easily sharpened throughout their entire cutting edges.

Another object of the invention is to provide an improved driving or pitman connection for the cutter bar of a mowing machine or the like.

With the above and other objects in view, the invention consists of the novel construction hereinafter fully described and claimed, and illustrated in the accompanying drawings, in which—

Figure 1 is a plan view of a portion of a mowing machine showing the invention applied thereto; Fig. 2 is a detail section through the parts shown in Fig. 1; Fig. 3 is a detail cross section through the cutting apparatus; Fig. 4 is a detail perspective of the tooth bar; Fig. 5 is a similar view of one of the cutting teeth; Fig. 6 is a perspective view of one of the retaining or guard plates; Fig. 7 is a plan view of the improved pitman; and Fig. 8 is a detail section taken on the line 8—8 in Fig. 7.

In the drawings 1 denotes the body portion of the cutter or finger bar on which are arranged the usual fingers 2 and 3 denotes the improved cutting teeth detachably or removably secured upon a reciprocatory tooth bar 4. Each of said teeth 3 has a beveled-edged, V-shaped cutting blade 5 to work within and between the fingers 2 and a rectangular body portion 6 which latter is formed with a rectangular passage or bore 7 to receive the bar 4. Said teeth 7 are preferably formed from a single piece of sheet metal or metal plate by bending one end of the same to form the rectangular body portion 6, as illustrated in the drawings. This body portion may be closed by welding or otherwise securing said bent end of the sheet or plate. The bar 4 has at its inner end an upwardly projecting lug or enlargement 8 formed with a pivot stud 8ª. Said enlargement 8 serves as a stop for the innermost tooth and also as a bearing for the pivot of the improved pitman 9. The other end of the tooth bar 4 is formed with a threaded socket to receive a screw 10 the head of which is sufficiently large to engage the end of the outermost tooth and thereby retain all of the cutting teeth upon the square bar. By reason of this construction it will be seen that should any of the teeth become broken or worn out such tooth or teeth may be conveniently replaced by new ones. The tooth bar is arranged to slide upon the finger bar 1 and the fingers 2 and it is held down upon the same by means of one or more removable guard plates 16 which project over and engage the upper faces of the teeth 3 and which have oppositely projecting apertured ears 12 bolted as at 13 upon the bar 1.

The pitman 9 is connected to the wrist pin 14 of a crank disk 15 fixed to a longitudinal shaft 16 which is in turn connected by beveled gears 17 to the axle 18 of the mower. Said pitman 9 has at its lower and outer end a recess 19 to receive the enlargement 8 and it is formed with a bearing opening 19ª to receive the pivot stud 8ª. The latter is retained in said opening 19ª by a spring 20 which is bolted as at 21 to the pitman. Said spring 20 can be bent outwardly so that the pitman and the tooth bar can be quickly connected and disconnected. The upper and inner end of the pitman has removably secured to its upper and lower edges by means of the bolts 22 two plates 23, the projecting extremities of which are adapted to receive between them two opposing bearing blocks 24, 25. The opposing faces of these blocks are shaped to receive the wrist pin 14 between them and their edges are grooved or channeled as at 26 to receive the plates or strips 23. The outermost bearing block 25 is rigidly secured between the plates 23 by means of a bolt 26ª and the innermost one 24 is slidable so that it can be adjusted to take up wear. This adjustment is effected by means of a tapered or wedge-shaped key 27 which is passed transversely through openings in the plates 23 and also through opposing grooves formed in the adjacent end of the pitman and the bearing block 24. When said key is driven inwardly it will be noted that block 24 will be forced in the direction of the wrist pin. The key 27 is adapted to be secured in an adjusted position by means of a set screw 28 arranged in a threaded opening formed in the pitman and attached to impinge in said key as clearly shown in Fig. 7. This bearing permits the parts to be quickly and easily adjusted to compensate for wear and thereby prevents looseness, lost motion and noise.

Having thus described my invention what I claim is:—

In a cutting mechanism for mowing machines, the combination of a cutter bar of rectangular shape in cross section and having a flat outer end formed with a screw threaded socket, the other end of said bar being formed with an integral upstanding lug, of substantially semi-cylindrical shape and adapted to serve as a stop and as a bearing, said lug having flat front and rear faces and being formed on its front face with a forwardly projecting cylindrical pivot pin, a plurality of removable cutting teeth, each formed from a single plate having its rear end bent upon itself to form a socketed body of rectangular shape for the reception of the rectangular cutter bar, the tooth at the inner end of said bar being engaged with said upstanding stop lug, a screw arranged in the threaded socket of one end of said cutter bar and having an enlarged head to bear against the outermost tooth to retain a series of teeth upon said bar, a finger bar adapted to receive the cutter bar and the teeth thereon, removable guard plates having apertured ears secured to the finger bar, and a forwardly projecting portion to rest upon the upper faces of the socketed body portions of the teeth, and a pitman engaged with said bearing lug and its pivot pin.

In testimony whereof I hereunto affix my signature in the presence of two witnesses.

WILLIAM CRAIN.

Witnesses:
W. C. DAVIS, Jr.,
ROY ALDEN.